US012726763B2

(12) United States Patent
Boutros et al.

(10) Patent No.: US 12,726,763 B2
(45) Date of Patent: Sep. 1, 2026

(54) NOISE MITIGATION FOR ELECTRONIC DEVICES

(71) Applicant: Apple Inc., Cupertino, CA (US)

(72) Inventors: Camellia G. Boutros, San Francisco, CA (US); Christopher T. Eubank, Santa Barbara, CA (US); Christopher J. Moulios, San Francisco, CA (US); Michael J. Rockwell, Palo Alto, CA (US); Ronald J. Guglielmone, Jr., Redwood City, CA (US); Steven A. Hales, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 180 days.

(21) Appl. No.: 18/507,016

(22) Filed: Nov. 10, 2023

(65) Prior Publication Data

US 2024/0214728 A1 Jun. 27, 2024

Related U.S. Application Data

(60) Provisional application No. 63/435,215, filed on Dec. 23, 2022.

(51) Int. Cl.

| | |
|---|---|
| ***H04R 3/00*** | (2006.01) |
| ***H04R 5/033*** | (2006.01) |
| ***H04R 5/04*** | (2006.01) |

(52) U.S. Cl.

CPC ............ *H04R 3/005* (2013.01); *H04R 5/033* (2013.01); *H04R 5/04* (2013.01)

(58) Field of Classification Search

CPC ........... H04R 3/005; H04R 5/033; H04R 5/04

See application file for complete search history.

(56) References Cited

U.S. PATENT DOCUMENTS

| | | | | |
|---|---|---|---|---|
| 8,295,504 | B2 | 10/2012 | Ady et al. | |
| 10,959,034 | B2 | 3/2021 | Brown et al. | |
| 11,032,653 | B2 | 6/2021 | Fung et al. | |
| 2012/0316869 | A1* | 12/2012 | Xiang | H04M 9/08 704/226 |
| 2016/0125867 | A1* | 5/2016 | Jarvinen | G10K 11/17857 381/73.1 |
| 2016/0265511 | A1 | 9/2016 | Petersen et al. | |
| 2021/0092517 | A1 | 3/2021 | Kulkarni et al. | |
| 2022/0374194 | A1 | 11/2022 | Casarini et al. | |
| 2024/0096306 | A1* | 3/2024 | Hudman | A63F 13/54 |

* cited by examiner

*Primary Examiner* — Joseph Saunders, Jr.

(74) *Attorney, Agent, or Firm* — BAKERHOSTETLER

(57) ABSTRACT

Aspects of the subject technology provide noise mitigation for electronic devices. Noise mitigation can mitigate the effect of a sound-generating component of an electronic device that generates sound as a byproduct of a primary function of the sound-generating component. The noise mitigation can include geometrically distributing another sound in a geometric distribution that mitigates the perceived effect of the sound of the sound-generating component on a user of the electronic device.

18 Claims, 9 Drawing Sheets

NOISE MITIGATION FOR ELECTRONIC DEVICES

CROSS REFERENCE TO RELATED APPLICATIONS

This application claims the benefit of priority to U.S. Provisional Patent Application No. 63/435,215, entitled, "Noise Mitigation For Electronic Devices", filed on Dec. 23, 2022, the disclosure of which is hereby incorporated herein in its entirety.

TECHNICAL FIELD

The present description relates generally to electronic devices, including, for example, noise mitigation for electronic devices.

BACKGROUND

An electronic device may include a fan for cooling the electronic device. The fan is generally controlled based on the temperature of the device, with the fan speed increasing when the device temperature rises and more cooling is needed.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

An electronic device may include one or more components that generate sound. The sound-generating components can include components that generate the sound as a primary function of the component (e.g., a speaker), or components that generate sounds as a byproduct of the primary function of the component (e.g., fans, haptic components, motors, or other components with moving parts). In some cases, a sound-generating component may be a thermal management component, such as a fan or other air-moving component of the electronic device.

In a case in which the sound-generating component is a thermal management component, it may be desirable to operate the component at a high setting that generates a high amount of byproduct noise when the device temperature is high. However, sounds that are generated by fans or other components for which the sound is a byproduct of the primary function of the component can be distracting or annoying to users of electronic devices. Thus, it can also be desirable to mask, blur, or otherwise mitigate the sound, at least in the perception of the user.

In one or more implementations, aspects of the subject technology can provide, using speakers of a device, an audio output that masks or blurs the sound of a component of the device. For example, a user's perception of the sound of a fan (e.g., a cooling fan) in a computing device can be blurred using a geometrically distributed simulation of the sound of the fan itself. In other examples, sounds in the physical environment of the device (e.g., a sound of a refrigerator, air conditioner, vacuum cleaner, dishwasher, sink, or other sound-generating device) can be sampled and output by a device to perceptually blur and/or otherwise mitigate the sound of the fan. In some implementations, a sampled sound from the physical environment can be projected, from the speakers of the device, to and/or toward the location from which the sound originated (e.g., whether or not the source of the physical environment sound is still producing the environmental sound).

Figure 1:
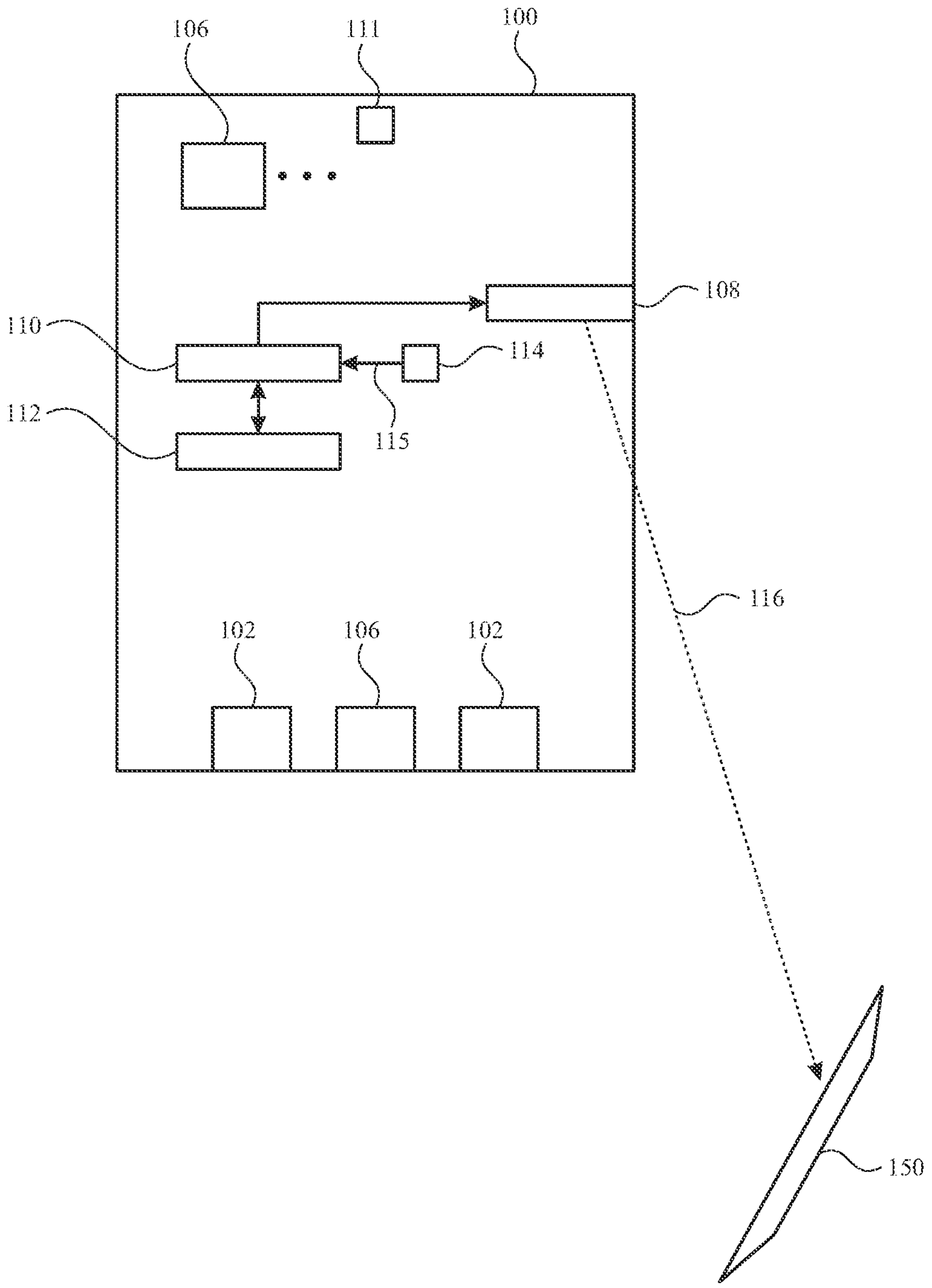
FIG. 1 illustrates a block diagram of an example electronic device with a sound-generating component in accordance with one or more implementations.

FIG. 1 illustrates an example electronic device in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In the example of FIG. 1, an electronic device 100 includes a sound-generating component 108. The sound-generating component 108 may be, for example, a thermal management component such as a fan (e.g., a cooling fan), a haptic component (e.g., a piezoelectric actuator), a motor, or any other device that generates sound as an unintended audio output (e.g., as a byproduct of the primary function of the component). The electronic device 100 may also include one or more speakers, such as speakers 102. Speaker 102 may be configured to generate sound as a primary function of the speaker. Although two speakers 102 and a single sound-generating component 108 are shown in FIG. 1, it is appreciated that the electronic device 100 may include one, two, three, more than three, or generally any number of speakers and/or sound-generating components.

As shown in FIG. 1, electronic device 100 may also include one or more microphones, such as microphones 106. Although two microphones are shown in FIG. 1, it is appreciated that the electronic device 100 may include two, three, more than three, or generally any number of microphones. In the example of FIG. 1, the speakers 102 and the microphones 106 are disposed in a common housing with the processing circuitry 110, the memory 112, and the sound-generating component 108. In other implementations, some or all of the speakers 102 and/or some or all of the microphones 106 may be disposed in one or more separate housings from the housing in which the processing circuitry 110, the memory 112, and the sound-generating component 108. In one illustrative example, the speakers 102 may be disposed in headphones or earbuds that are communicatively (e.g., via a wired or wireless connection) with the processing circuitry 110, the memory 112, and the sound-generating component 108.

In one or more implementations, the electronic device 100 may include one or more input sensors, such as input sensor 111. As examples, input sensor 111 may be or include one or more cameras, one or more depth sensors, one or more touch sensors, one or more device-motion sensors, one or more sensors for detecting and/or mapping one or more user physical characteristics (e.g., a Head Related Transfer Function or HRTF), one or more sensors for detecting one or more movements, and/or user gestures, such as hand gestures, one or more sensors for detecting features and/or motions of one or both eyes of a user, such as sensors for tracking a gaze location at which the user of the electronic device is gazing (e.g., a location within a user interface of an application being actively utilized at the electronic device 100), and/or one or more sensors for detecting and/or mapping one or more environmental physical features of a physical environment around the electronic device 100 (e.g., for generating a three-dimensional map of the physical environment).

Electronic device 100 may be implemented as, for example, a portable computing device such as a desktop computer, a laptop computer, a smartphone, a peripheral device (e.g., a digital camera, headphones), a tablet device, a smart speaker, a set-top box, a content streaming device, a wearable device such as a watch, a band, a headset device, wired or wireless headphones, one or more wired or wireless earbuds (or any in-ear, against the ear or over-the-ear device), and/or the like, or any other appropriate device that includes one or more sound-generating components.

Although not shown in FIG. 1, electronic device 100 may include one or more wireless interfaces, such as one or more near-field communication (NFC) radios, WLAN radios, Bluetooth radios, Zigbee radios, cellular radios, and/or other wireless radios. Electronic device 100 may be, and/or may include all or part of, the electronic system discussed below with respect to FIG. 8.

In the example of FIG. 1, processing circuitry 110 of the electronic device 100 is driving the sound-generating component 108. For example, processing circuitry 110 of the electronic device 100, using power from a power source of the electronic device 100 such as a battery of the electronic device, may drive a sound-generating component 108, such as to operate a cooling fan for cooling of the electronic device 100. In one or more implementations, the electronic device 100 may include one or more sensors, such as sensor 114. For example, sensor 114 may be a thermal sensor, such as thermistor, that monitors the temperature of one or more components and/or parts of the electronic device 100. As illustrated in FIG. 1, the processing circuitry 110 may control the operation of the sound-generating component 108 based, in part, on sensor information 115 from the sensor 114. For example, the processing circuitry 110 may increase a setting (e.g., a fan speed) of the sound-generating component 108 (e.g., a fan) when the sensor information 115 from the sensor 114 indicates an increase in temperature of the electronic device 100 or an increase in processing power usage of the electronic device 100.

In one or more implementations, the processing circuitry 110 may also control the fan speed of a fan, or another operational setting of another sound-generating component based on power information (e.g., processing power usage information, processing cycles information) and/or other information such as telemetry information received from one or more remote devices and/or systems (e.g., including environmental information, such as an ambient temperature and/or an ambient humidity, and/or including state information for one or more other devices or systems, such as paired device or system). For example, processing circuitry 110 may increase the fan speed of a fan of the electronic device 100 in anticipation of an increase in temperature, such as based on an increase of processing cycles of the processing circuitry 110 that is anticipated to raise the temperature of the processing circuitry 110. As shown, the electronic device 100 may include memory 112. The processing circuitry 110 may, in one or more implementations, execute one or more applications, software, and/or other instructions stored in the memory 112 (e.g., to implement one or more of the processes, methods, activities, and/or operations described herein).

As shown in FIG. 1, sound 116 from the sound-generating component 108 may be received at an ear 150 of a user of the electronic device 100 during operation of the sound-generating component 108. In various use cases, the sound of the sound-generating component 108 may be distracting or unpleasant for the user. For example, the sound 116 generated by the sound-generating component 108 is a byproduct (e.g., noise) of the primary function of the sound-generating component 108 (e.g., the sound of a fan whose primary function is to cool the electronic device 100). For this reason, it may be desirable mask, blur, or otherwise mitigate at least the user's perception of the sound 116 that is heard by the user.

Figure 2A:
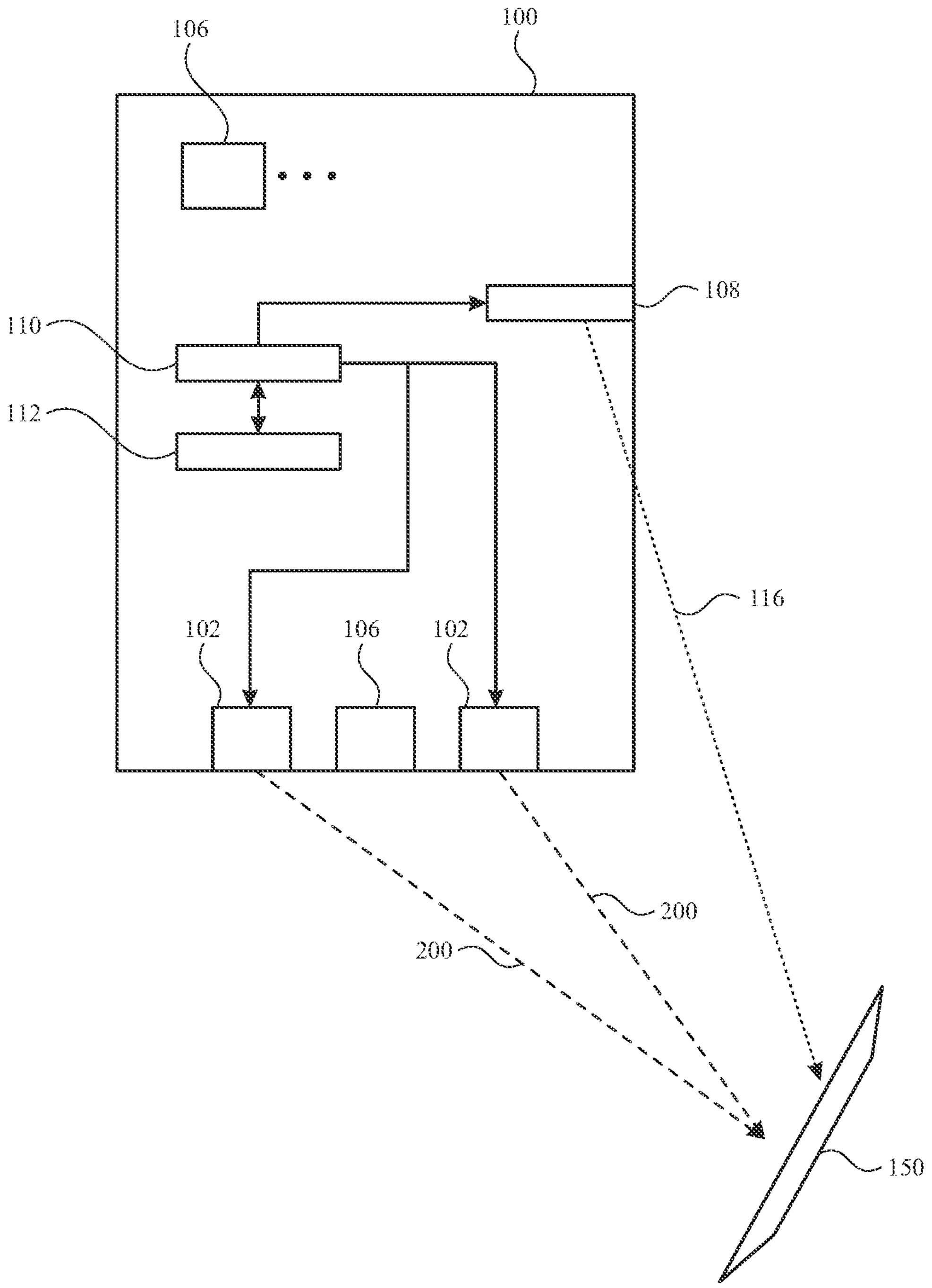
FIG. 2A illustrates a block diagram of the example electronic device of FIG. 1 generating mitigating sounds in accordance with one or more implementations.

As shown in FIG. 2A, in one or more implementations, the electronic device (e.g., the processing circuitry 110) may operate speakers 102 to output audio content to mitigate the sound 116 of the sound-generating component 108. For example, the electronic device (e.g., the processing circuitry 110 of FIG. 1) may operate speakers 102 to output sound 200 (including audio content) in a geometric distribution that is configured to mitigate the sound 116 of the sound-generating component 108 (e.g., to mitigate a user's perception of the sound 116 while the sound 116 continues to be generated by the sound-generating component 108). For example, as described in further detail hereinafter, the electronic device 100 may obtain (e.g., generate or retrieve from storage) a geometric distribution for an output of the audio content.

Figure 2B:
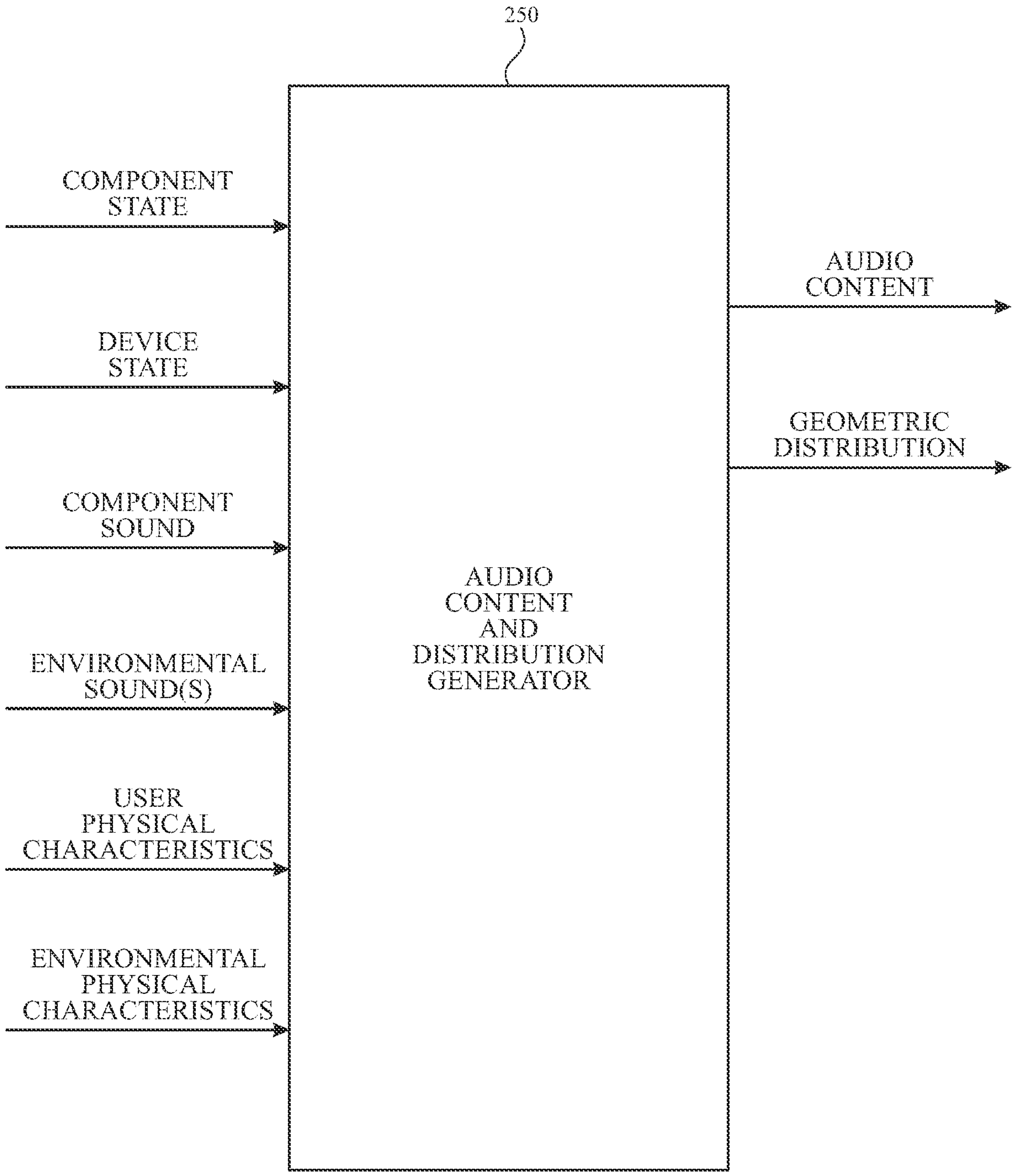
FIG. 2B illustrates a block diagram of a process at the example electronic device of FIG. 1 obtaining audio content and determining a geometric distribution for the audio content in accordance with one or more implementations.

FIG. 2B illustrates a block diagram of an example process that can be implemented at the electronic device 100 for obtaining audio content and a geometric distribution for the audio content. In the example of FIG. 2B, an audio content and distribution generator 250 receives various inputs, and provides (i) audio content for output by the speakers 102 of the electronic device 100 (e.g., and/or by one or more other speakers, such as remote speakers), and (ii) a geometric distribution for the audio content. Although the audio content and distribution generator 250 is depicted in FIG. 2B as being a single block or single process, it is appreciated that the functions of the audio content and distribution generator 250 described herein can be performed by a single process or multiple separate processes, and any or all of these processes may be implemented in hardware, software, or a combination of hardware and software.

The geometric distribution provided by the audio content and distribution generator 250 may be configured to mitigate a sound corresponding to the sound-generating component. A geometric distribution for output of audio content may refer to the one or more directions in which in which audio is output from one or more speakers, one or more locations in the physical environment of a device at which sound from multiple speakers constructively interfere (e.g., and create the perception that the sound is being generated at those one or more locations of constructive interference), and/or one or more locations in the physical environment of a device at which sound from multiple speakers destructively interfere (e.g., and create a geometric hole in which the sound from the multiple speakers cannot be heard or is reduced in amplitude). For example, by projecting the sound 200 in one or more directions and/or to generate one or more nulls or geometric holes in the geometric distribution of the sound 200 in the physical environment, a user's perception of the sound 116 can be masked, blurred, or otherwise mitigated.

As illustrated in FIG. 2B, inputs to the audio content and distribution generator 250, based on which the audio content and the geometric distribution can be obtained, may include a component state of the sound-generating component 108 (e.g., an on/off state or an operating state, such as a fan speed of a fan, that correlates with an amount of the sound being generated by the sound-generating component), a device state (e.g., a type of application being executed by the processing circuitry 110, a content state of display content being displayed on a display of the electronic device, a etc.), one or more input (e.g., recorded or streaming) sounds such as a component sound (e.g., the sound 116) of the sound-generating component 108 and/or one or more environmental sounds of one or more environmental sound sources in the physical environment of the electronic device, user physical characteristics (e.g., a Head Related Transfer Function or HRTF) of a user of the electronic device), and/or environmental physical characteristics (e.g., a three-dimensional map of the physical environment surrounding the electronic device).

In one or more implementations, the audio content and distribution generator 250 may also determine whether or not to output any audio content for mitigating the sound 116 of the sound-generating component 108. For example, in a use case in which the device state indicates that the electronic device is executing an application that provides audio output (e.g., music and/or including ambient sounds), the audio content and distribution generator 250 may determine that no audio content for mitigating the sound 116 should be output, or that audio content for mitigating the sound 116 should cease to be output.

In various examples as described herein, the audio content (e.g., provided by the audio content and distribution generator 250 for output by the speakers 102 in the sound 200) may include a simulation, a recording, or another representation of the component sound (e.g., the sound 116) of the sound-generating component 108 itself, or can include one or more other sounds, such as one or more of the environmental sounds obtained (e.g., recorded or sampled) from the physical environment of the electronic device 100. In one or more implementations, the audio content may include multiple audio layers, (e.g., at least a first audio layer and a second audio layer), and the electronic device (e.g., the processing circuitry 110 of FIG. 1) may operate speakers 102 to output the audio content in the geometric distribution by outputting the first audio layer in first geometric distribution and outputting the second audio layer in a second geometric distribution different from the first geometric distribution. In one or more implementations, the first audio layer may have first frequency characteristics that are different from second frequency characteristics of the second audio layer (e.g., different audio frequencies may be output in different geometric distributions in some implementations).

For example, in a use case in which the audio content includes a recording or sample of the sound 116 (e.g., the component sound that is input to the audio content and distribution generator 250), the first audio layer may include substantially the full recording or sample of the sound 116, and the second audio layer may include a selected frequency band (e.g., a low frequency band) of the recording or sample of the sound 116. In this example, the second geometric distribution for the selected frequency band may distribute the selected frequency band to one or more locations further from the electronic device 100 than the first geometric distribution distributes the full recording or sample of the sound 116.

In general, the audio content and distribution generator 250 may provide geometric distributions that distribute lower frequency audio layers to locations further from the electronic device 100 than relatively higher frequency audio layers. In one or more implementations, the audio content and distribution generator 250 may include a simulated audio content layer in the audio content. For example, in the use case in which the first audio layer includes substantially the full recording or sample of the sound 116, and the second audio layer includes a selected frequency band (e.g., a low frequency band) of the recording or sample of the sound 116, the audio content may include a third audio layer that includes a simulated airflow sound (e.g., a simulated wind noise, which may have a characteristic frequency lower than the characteristic frequency of the selected frequency band of the sound 116). In this example, the audio content and distribution generator 250 may provide a third geometric distribution for the third audio layer. For example, the third geometric distribution for the third audio layer may distribute the third audio layer to one or more locations further from the electronic device 100 than the first geometric distribution distributes the full recording or sample of the sound 116 and further than the second geometric distribution distributes the selected frequency band. In one or more implementations, the audio content and distribution generator 250 may remove or suppress one or more frequency ranges of the first audio layer, the second audio layer, and/or the third audio layer (e.g., by suppressing or removing a middle frequency range of the first audio layer, the second audio layer, and/or the third audio layer). It is appreciated that, in one or more implementations, projecting audio content or sound to a location in a physical environment, as described herein, may include operating multiple speakers of an electronic device to project the sound in a way that causes a listening user to perceive the audio content or sound as emanating from that location, even though the sound itself is emanating from the speakers. In one or more implementations, the audio content and/or the geometric distribution for the audio content may be based, at least in part, on the user physical characteristics provided to the audio content and distribution generator 250. In one or more implementations, the audio content and/or the geometric distribution for the audio content may be based, at least in part, on the environmental physical characteristics provided to the audio content and distribution generator 250.

Figure 3:
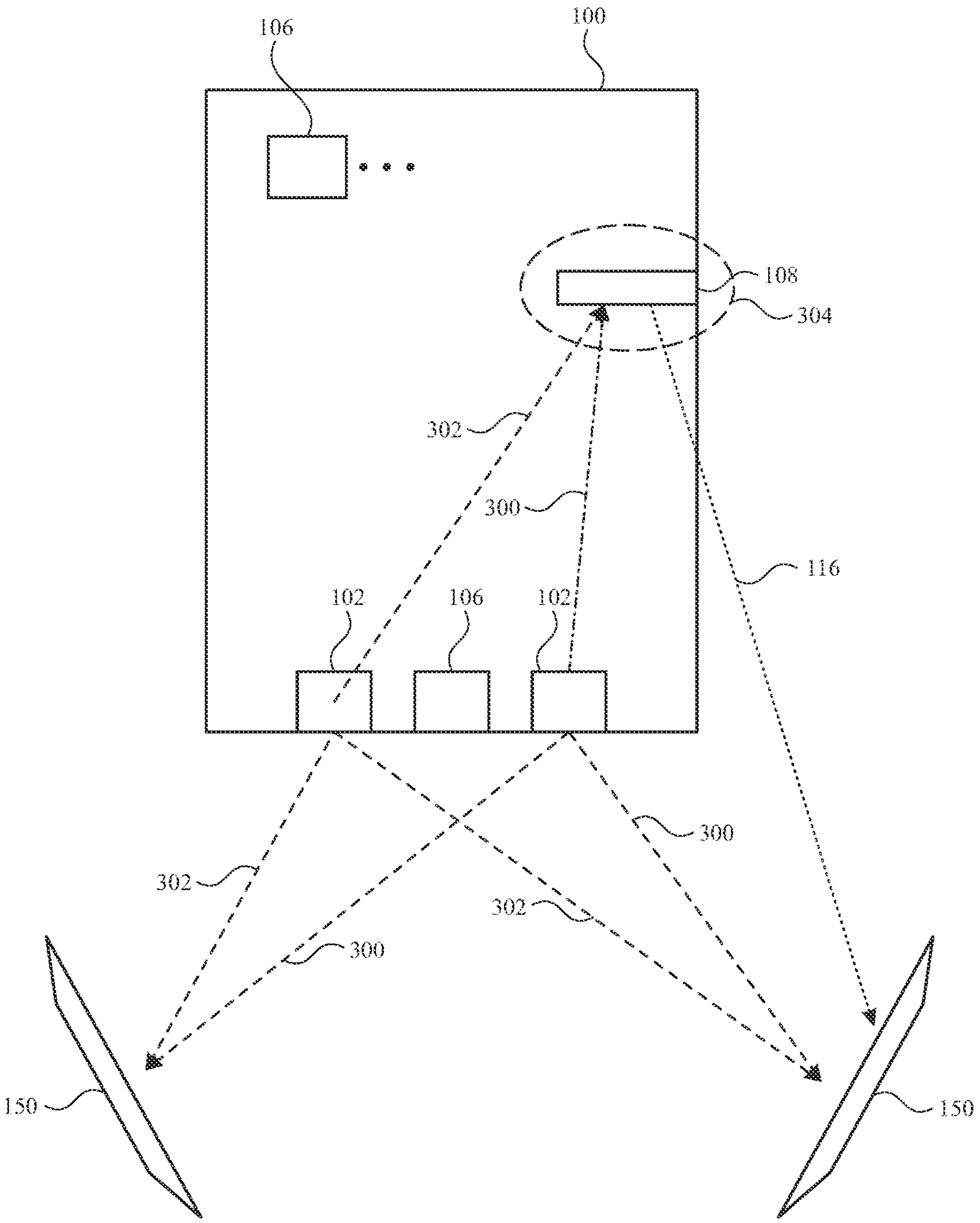
FIG. 3 illustrates a block diagram of the example electronic device of FIG. 1 generating binaural mitigating sounds in accordance with one or more implementations.

FIG. 3 illustrates a use case in which the speakers 102 output audio content (e.g., by generating sound 300 and sound 302) in a geometric distribution that generates a geometric hole 304 in the sound from the speakers 102, at or near the location of the sound-generating component 108. For example, as illustrated by the solid and dot-dashed lines between the speakers 102 and the sound-generating component 108, the speakers 102 may output the sound 300 and the sound 302 such that the sound 300 and the sound 302 negatively interfere with each other at or near the location of the sound-generating component 108 to generate the geometric hole 304 in the sound (e.g., such that a user listening at or near the location of the sound-generating component 108 would not hear the sound 300 or the sound 302, or would hear a reduced amount of the sound 300 and the sound 302). In one or more implementations, generating the geometric hole 304 may also, or alternatively, include refraining from outputting a representation of the sound 116 from a speaker 102 that is located near the sound-generating component 108 while outputting the representation of the sound 116 with other speakers 102 of the electronic device 100.

In the example of FIG. 3, in one or more implementations, the audio content (e.g., the sound 300 and the sound 302) may be binaural and non-spatial. In one or more use cases, outputting sound corresponding to binaural and non-spatial audio, with a geometric hole 304 in the sound at the location of the sound-generating component 108, may perceptually delocalize the sound 116 of the sound-generating component 108 for the user, which may reduce, blur, or otherwise mitigate the perceived effect on the user of the sound 116. In this example, in one or more implementations, the sound 300 and the sound 302 may include audio content that includes a (e.g., binaural and non-spatial) simulation or reproduction of the sound of the sound-generating component 108 itself.

In various implementations, one speaker 102 may output audio content for one corresponding ear 150 of a user, and/or multiple speakers 102 can output audio content for both ears 150 of the user (e.g., as in the example of FIG. 3). In the example of binaural and non-spatial audio content, a left speaker 102 (e.g., a left headphone or a left earbud) may output sound 302 (e.g., including audio content recorded for a left ear of a listening) to a left ear 150 of a user, and a right speaker 102 (e.g., a right headphone or a right earbud) may output sound 300 (e.g., including audio content recorded for a right ear of a listener) to a right ear 150 of a user, such that the audio content (e.g., including the location of the geometric hole 304) does not change relative to the user's ear(s) as the user moves and/or turns their head within the physical environment of the electronic device 100.

In other examples, the sound 200 from the speakers 102 may include audio content obtained from the physical environment of the electronic device 100 and may, in some implementations, be spatial audio that changes as the user moves and/or turns their head within the physical environment of the electronic device 100. For example, FIG. 4 illustrates how the physical environment of the electronic device 100 may include one or more sound-generating elements in the physical environment.

Figure 4:
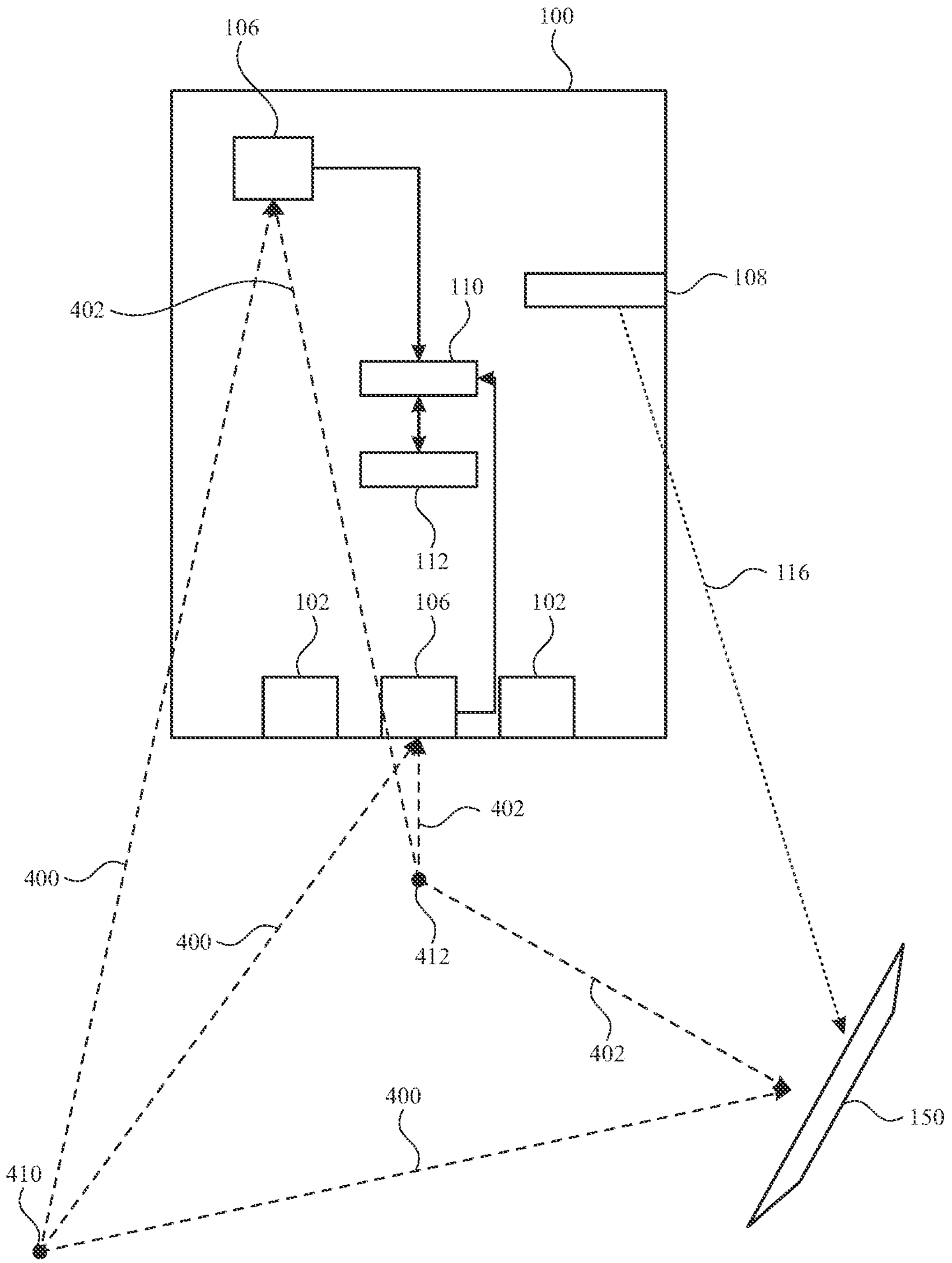
FIG. 4 illustrates a block diagram of the example electronic device of FIG. 1 obtaining sounds from sound-generating entities in a physical environment of the electronic device in accordance with one or more implementations.

In the example use case of FIG. 4, while the electronic device 100 is driving the sound-generating component 108, one or more environmental sound sources such as environmental sound source 410 and/or environmental sound source 412 may generate sounds (e.g., environmental sound 400 and environmental sound 402, respectively) that are received at the ear(s) 150 of the user. Environmental sound sources 410 and 412 may include a room fan, an air conditioner, a heater, a refrigerator, street noise from a window or a doorway, a vacuum cleaner, or any other environmental entity in the physical environment of the electronic device that generates sound as a primary function thereof or as a byproduct of the primary function thereof.

As illustrated in FIG. 4, when the environmental sound sources 410 and/or 412 are generating environmental sound 400 and/or environmental sound 402, the environmental sound 400 and/or environmental sound 402 may reach the ear(s) 150 of the user along with the sound 116 of the sound-generating component 108, which may perceptually mitigate the effect of the sound 116 to the user. In one or more implementations, the electronic device 100 may operate the speakers 102 to supplement the environmental sounds of one or more environmental sound sources and/or to replace the sound(s) of one or more environmental sound sources when the environmental sound sources are not present and/or not generating sound (e.g., not operating). For example, because a user of the electronic device 100 may be accustomed to hearing the environmental sound 400 and/or the environmental sound 402 in their physical environment, supplementing or replacing these environmental sounds using the speakers 102 may not be noticed or bothersome to the user in the way the sound 116 of the fan along might be, and may perceptually mask the sound 116 when they are present.

For example, as shown in FIG. 4, the environmental sound 400 and environmental sound 402 of the environmental sound sources 410 and 412 may be received at the microphone(s) 106 of the electronic device 100. Using the microphones 106, the electronic device 100 (e.g., the processing circuitry 110 and the memory 112) may record or sample the environmental sound 400 and the environmental sound 402. In one or more implementations, the environmental sound 400 and/or environmental sound 402 (e.g., and/or other environmental sounds) maybe recorded spatially (e.g., by using the microphones 106 as a beamforming microphone array, and determining and storing the three-dimensional locations of the recorded environmental sounds, along with the recorded environmental sounds). In this way, in one or more implementations, an electronic device, such as the electronic device 100, may opportunistically record real background sounds and room tones spatially (e.g., including heating, ventilation, and air conditioning (HVAC) noise, parking lot noises, and/or other environmental noises and/or other sounds).

Figure 5:
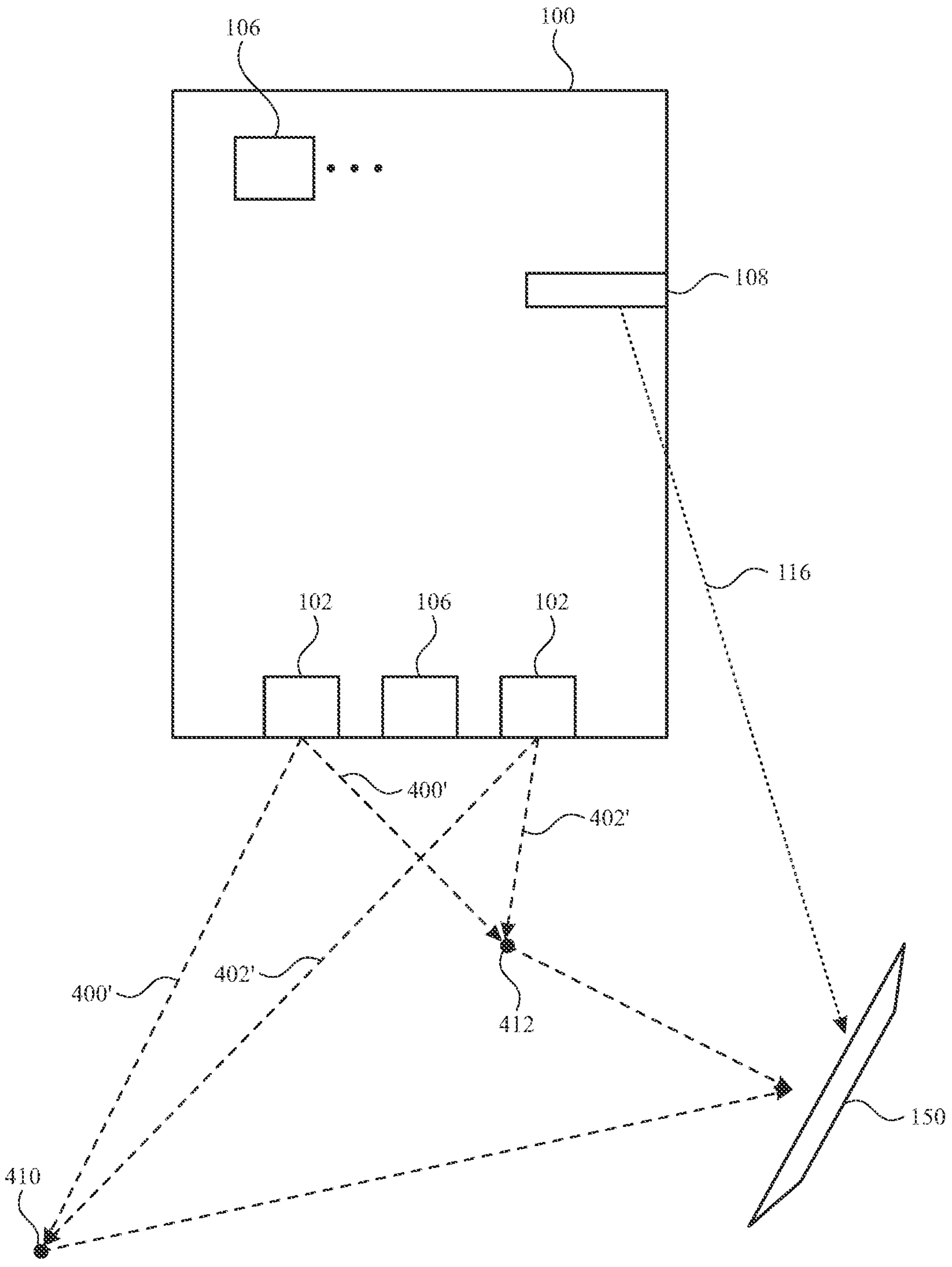
FIG. 5 illustrates a block diagram of the example electronic device of FIG. 4 outputting previously obtained sounds from the sound-generating entities in the physical environment of the electronic device in accordance with one or more implementations.

As illustrated in FIG. 5, the electronic device 100 may then operate the speakers 102 to output a recorded environmental sound 400' corresponding to the environmental sound 400 of the environmental sound source 410 and a recorded environmental sound 402' corresponding to the environmental sound 402 of the environmental sound source 412. In this way, an electronic device, such as the electronic device 100, may (e.g., synthetically) inject recorded real background noise(s) into the physical environment to mask, blur, or otherwise mitigate the effect of the sound 116 on the user. In some cases, the output of the recorded environmental sounds (e.g., background noise(s)) can be amplified, by the speakers 102, relative to the original environmental sounds. In one or more implementations, the recorded environmental sound 400' and/or the recorded environmental sound 402' may be modified before being output, such as by modifying an amplitude, a frequency, an envelope, or a playback speed of the recorded environmental sound 400' and/or the recorded environmental sound 402'.

In one or more implementations, the electronic device 100 (e.g., the audio content and distribution generator 250) can obtain a geometric distribution for output of environmental sounds by identifying locations for projected audio sources in the physical environment, to generate a simulated soundscape in which environmental sound playback can simulate the environmental sound(s) as if they are coming from physical objects or locations (e.g., air conditioning sounds that are perceived to come from an HVAC system or vent, and/or parking lot noises that are perceived to come from windows). For example, as illustrated in FIG. 5, the electronic device 100 may operate the speakers 102 to project the recorded environmental sound 400' corresponding to the environmental sound 400 of the environmental sound source 410 to the location of the environmental sound source 410, and to project the recorded environmental sound 402' corresponding to the environmental sound 402 of the environmental sound source 412 to the location of the environmental sound source 412. In this way, the user of the electronic device 100 may perceive the recorded environmental sound 400' that is output from the speaker(s) 102 of the electronic device as emanating from the environmental sound source 410, and perceive the recorded environmental sound 402' that is output from the speaker(s) 102 of the electronic device as emanating from the environmental sound source 412 (e.g., whether or not the environmental sound source 410 or the environmental sound source 412 are generating sound at that time).

In one or more implementations, the electronic device 100 may respond to thermal pressure and fan speed, and use audio content from one or more specifically crafted sound files to perceptually mask, blur, or otherwise mitigate (alleviate) the effect of (e.g., the user's perception of) sound resulting from a ramp in fan speed. In one or more implementations, the electronic device 100 may perform processing operations the sound file(s), such as to reduce or eliminate any obvious loop points or aggressors in the resulting audio output and/or the remove or suppress one or more frequency bands in the sound file(s). In one or more implementations, the electronic device 100 may generate aesthetically designed masking sounds to be played back from the speaker(s) 102 in a virtual acoustic simulation. In this way, the electronic device 100 may generate a combination of a spatial audio output and acoustic simulation to create the perception of one or more point sources of designed sound in the physical environment. For example, simulated sound in the physical environment can enhance an effect of masking.

In one or more use cases, a user may be using a music application or other media application running on the electronic device in shuffle mode or a radio mode in which the user does not specifically select each next song to be played. In one or more implementations, the electronic device 100 may perform a signal analysis of a media (e.g., music) library, and select songs for output by the speaker 102 that provide the frequency masking audio content for different noise profiles for the sound-generating component 108 (e.g., fan speed profiles of a fan). In this way, the electronic device 100 can, in some examples, craft a music station or playlist to optimally mask the sound 116 from the sound-generating component 108.

In the example of FIG. 5, the electronic device 100 is illustrated as operating the speakers 102 to project the recorded environmental sound 400' to the location of the environmental sound source 410, and to project the recorded environmental sound 402' to the location of the environmental sound source 412. In one or more implementations, the electronic device 100 may also, or alternatively, project sounds from the electronic device and/or from the physical environment to one or more locations other than the location (s) of the original source(s) of the sound.

Figure 6:
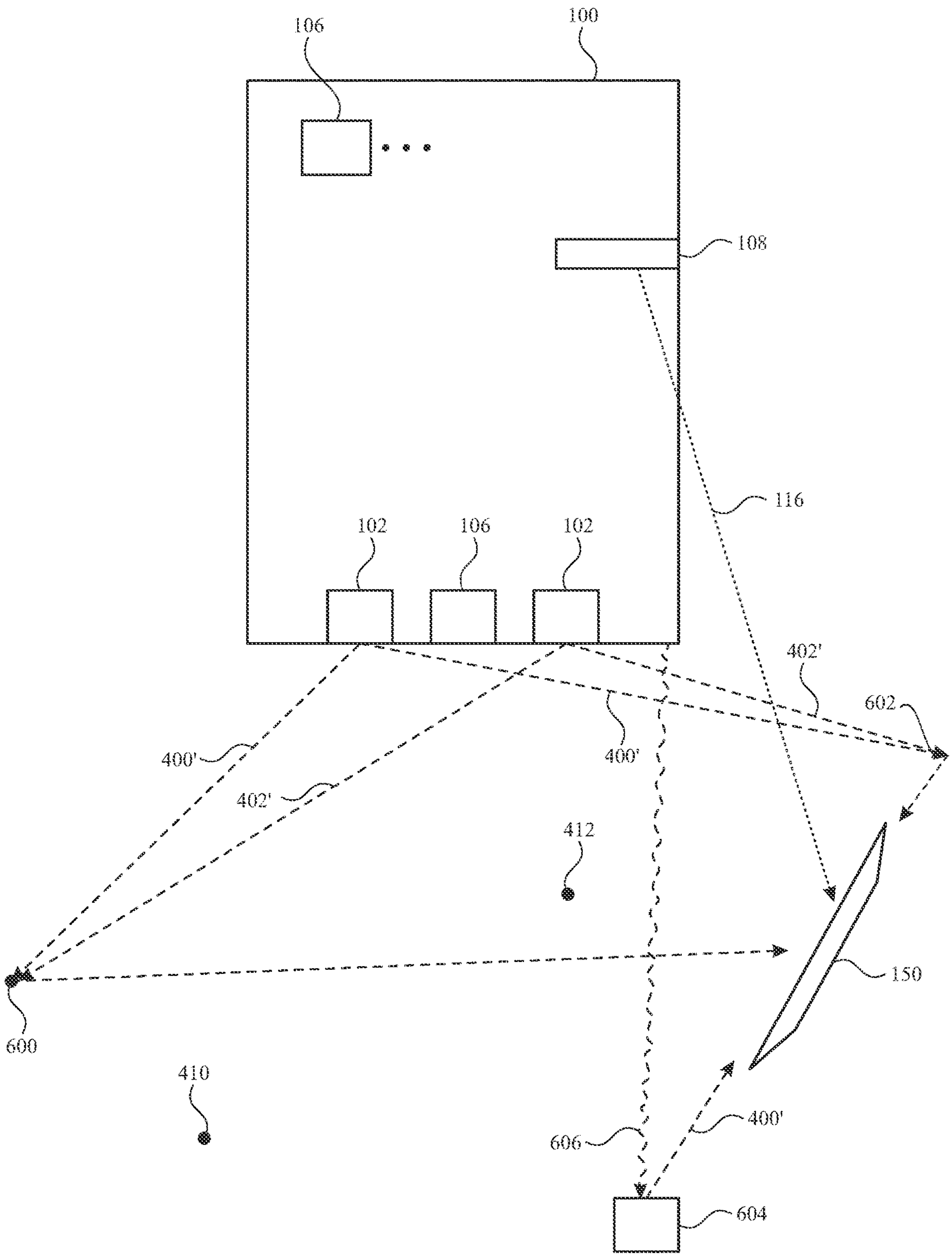
FIG. 6 illustrates a block diagram of the example electronic device of FIG. 1 projecting previously obtained sounds from sound-generating entities in a physical environment to locations in the physical environment other than the locations of the sound-generating entities in accordance with one or more implementations.

For example, FIG. 6 illustrates an example in which the electronic device 100 operates the speakers 102 to project the recorded environmental sound 400' (corresponding to the environmental sound 400 of the environmental sound source 410) to a location 600 different from the location of the environmental sound source 410. In this example, the electronic device 100 operates the speakers 102 to project the recorded environmental sound 402' (corresponding to the environmental sound 402 of the environmental sound source 412) to a location 602 different from location of the environmental sound source 412. For example, the electronic device 100 may obtain a recording or a sample of sound of an air conditioner or a heater, and operate the speaker 102 to geometrically or spatially redistribute the sound of the air conditioner or heater around the user to convert the local sound of the air conditioner or heater into a generalized ambient sound from the acoustic perspective of the user. FIG. 6 also illustrates how, in one or more implementations, the electronic device 100 may provide audio content (e.g., a recording or representation of the sound 116 of the sound-generating component 108, of the environmental sound 400 of the environmental sound source 412, and/or of the environmental sound 402 of the environmental sound source 412) and provide the audio content to a remote speaker 604 (e.g., speaker having a housing that is physically separate from the housing of the electronic device 100) for output. In the example of FIG. 6, the electronic device 100 transmits an electromagnetic signal 606 (e.g., a WiFi signal, a Bluetooth signal, or other radio frequency electromagnetic signal) encoding the recorded environmental sound 400' to the remote speaker 604, and the remote speaker 604 also outputs the recorded environmental sound 400'.

Figure 7:
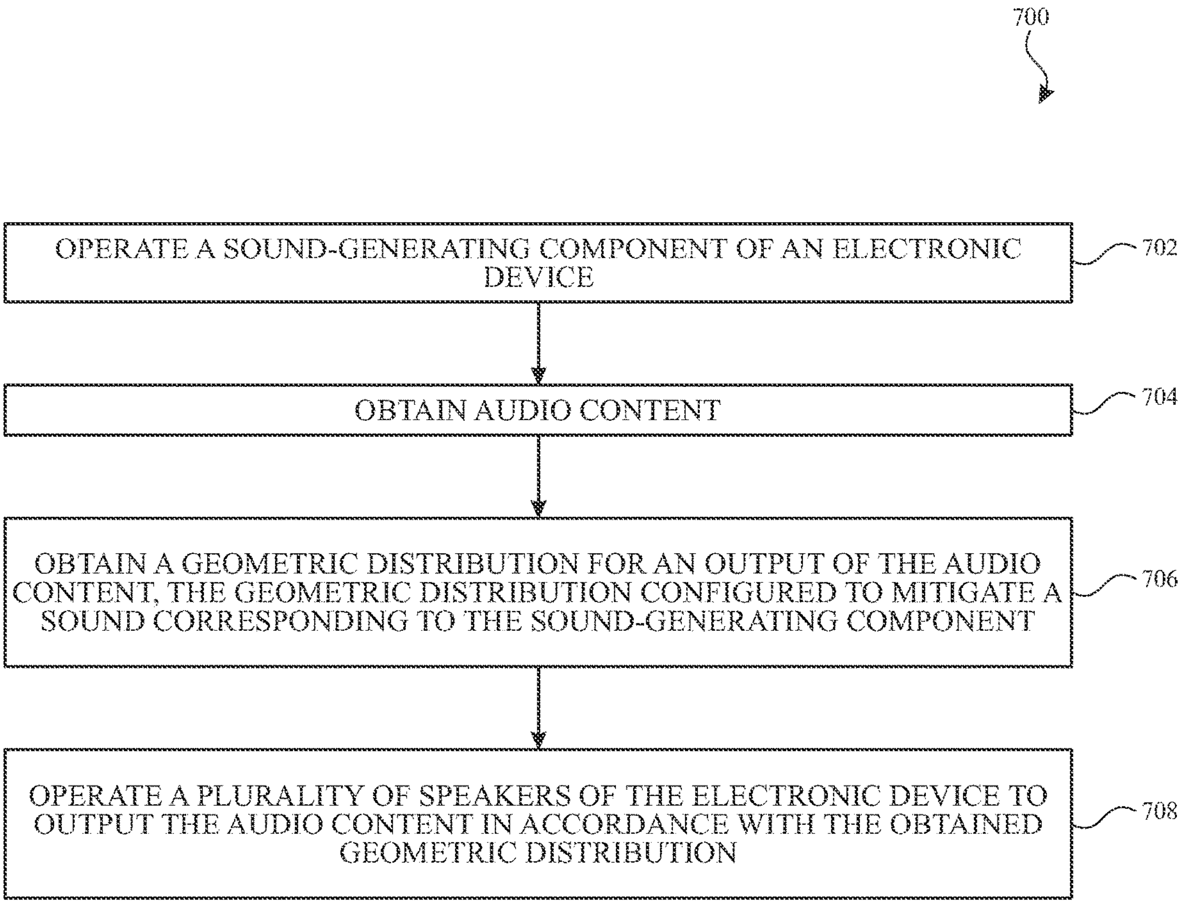
FIG. 7 illustrates a flow diagram of example process for noise mitigation for electronic devices in accordance with one or more implementations.

FIG. 7 illustrates a flow diagram of an example process for noise mitigation for an electronic device, in accordance with one or more implementations. For explanatory purposes, the process 700 is primarily described herein with reference to the electronic device 100 of FIG. 1. However, the process 700 is not limited to the electronic device 100 of FIG. 1, and one or more blocks (or operations) of the process 700 may be performed by one or more other components and other suitable devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

In the example of FIG. 7, at block 702, an electronic device (e.g., electronic device 100) may operate a sound-generating component (e.g., sound-generating component 108) of the electronic device. For example, sound may be generated by the sound-generating component as a byproduct of a primary function of the component. For example, the primary function of the component may be a thermal management function for the electronic device. In one or more implementations, the sound-generating component may be a fan (e.g., a cooling fan).

At block 704, the electronic device (e.g., the audio content and distribution generator 250) may obtain audio content. In one or more implementations, the audio content may include a representation (e.g., a recording, a modified recording, or a simulation) of the sound of the sound-generating component. For example, the audio content may include a representation of the sound of the fan. In one or more implementations, the audio content may include a sample of an environmental sound (e.g., environmental sound 400 or environmental sound 402) generated by a sound-generating entity (e.g., environmental sound source 410 or environmental sound source 412) in a physical environment around the electronic device.

In one or more implementations, the audio content may include spatial audio content. In one or more implementations, the audio content may include binaural and non-spatial audio content. In one or more implementations, obtaining the audio content may include obtaining the audio content by recording an environmental sound of a sound-generating entity in a physical environment of the device.

At block 706, the electronic device (e.g., the audio content and distribution generator 250) may obtain a geometric distribution for an output of the audio content. The geometric distribution may be configured to mitigate a sound (e.g., sound 116) corresponding to the sound-generating component. In various implementations, the geometric distribution may be obtained separately from the audio content, or obtaining the audio content (at block 704) may include obtaining audio content having a geometric distribution that is configured to mitigate a sound (e.g., sound 116) corresponding to the sound-generating component. The geometric distribution may be a predetermined geometric distribution, or may be determined by the electronic device based on a current state of the sound-generating component, a user, the electronic device, and/or a physical environment as described herein. A geometric distribution for output of audio content may refer to the one or more directions in which in which audio is output from one or more speakers, one or more locations in the physical environment of one or more speakers at which sound from multiple speakers constructively interfere (e.g., and creates the perception that the sound is being generate at those one or more locations of constructive interference), and/or one or more locations in the physical environment of one or more speakers at which sound from multiple speakers destructively interferes (e.g., and creates a geometric hole where the sound from the multiple speakers cannot be heard or is reduced in amplitude). A geometric distribution for output of audio content may include a map (e.g., a three-dimensional map, or a function representing a three-dimensional map of the loudness of a sound at various locations in a physical environment and/or various locations relative to a speaker outputting the audio content). A geometric distribution may include a single geometric distribution for all frequencies and/or layers of audio content, or may include multiple (e.g., different) geometric distributions for multiple (e.g., different) frequencies and/or layers of audio content.

In one or more implementations, a geometric distribution for sound may include a geometric hole (e.g., geometric hole 304) in the sound at or near a location of the sound-generating component, and/or a projection of a representation of the sound to one or more other locations different from the location of the sound-generating component. For example, in one or more implementations, the audio content may include at least a first audio layer and a second audio layer, and the electronic device may operate the speakers to output the audio content in accordance with the obtained geometric distribution by outputting the first audio layer in a first geometric distribution and outputting the second audio layer in a second geometric distribution different from the first geometric distribution. In one or more implementations, the first audio layer has first frequency characteristics that are different from second frequency characteristics of the second audio layer. In this example, two audio layers are described as being output with two corresponding geometric distributions. In other examples, one audio layer, three audio layers, or more than three audio layers may be output in one geometric distribution, three geometric distributions, and/or more than three geometric distributions.

In one or more implementations, the electronic device may obtain the geometric distribution based on a physical characteristic (e.g., an HRTF or other physical characteristic) of a user of the electronic device. In one or more implementations, the electronic device may obtain the geometric distribution based on a three-dimensional map of a physical environment around the electronic device (e.g., to determine one or more locations in the physical environment to which to project sound and/or to account for acoustic features in the physical environment when projecting the sound using the speakers). In one or more implementations, the electronic device may obtain the audio content by selecting media content having one or more frequencies that are the same as or complementary to a frequency of the sound of the sound-generating component. In one or more implementations, the electronic device may detect a change in an operating state of the device (e.g., a change to a full screen virtual environment with its own ambient sounds), and (e.g., responsively) cease outputting the audio content.

At block 708, the electronic device may operate speakers (e.g., two speakers, three speakers, four speakers, more than four speakers, a beamforming array of speakers, etc.) of the electronic device to output the audio content in accordance with the obtained geometric distribution. Operating the speakers to output the audio content may include generating sound (e.g., sound 200, sound 300, sound 302, environmental sound 400', or environmental sound 402', as examples) with the speakers. In one or more implementations, operating the speakers to output the audio content in accordance with the obtained geometric distribution may include operating the speakers as a beamforming speaker array to project the recorded environmental sound of the sound-generating entity (e.g., environmental sound source 410 and/or environmental sound source 412) to a location of the sound-generating entity in the physical environment (e.g., and/or to one or more other locations in the physical environment, as described herein in connection with FIG. 6).

In one or more implementations, operating the speaker to output the audio content in accordance with the obtained geometric distribution may include modifying one or more parameters of the output based on the operation of the sound-generating component (e.g., based on a loudness of a sound being generated by the sound generating component, such as in decibels (dB), or on an operating state of the sound-generating component, such as a fan speed of a fan) and/or based on a context of the electronic device (e.g., based on a device operational mode, an application running on the device, and/or the component state, device state, component sound, environmental sounds, user physical characteristics, and/or environmental physical characteristics described herein in connection with FIG. 2B). As examples, operating the speaker to output the audio content in accordance with the obtained geometric distribution may include modifying a gain that is applied to the audio content for output, and/or modifying a playback speed of the audio content, based on the operation of the sound-generating component and/or based on a context of the electronic device.

As described above, one aspect of the present technology is the gathering and use of data available from specific and legitimate sources for processing user information in association with providing noise mitigation for electronic devices. The present disclosure contemplates that in some instances, this gathered data may include personal information data that uniquely identifies or can be used to identify a specific person. Such personal information data can include voice data, speech data, audio data, demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for noise mitigation for electronic devices. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of noise mitigation for electronic devices, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data.

Figure 8:
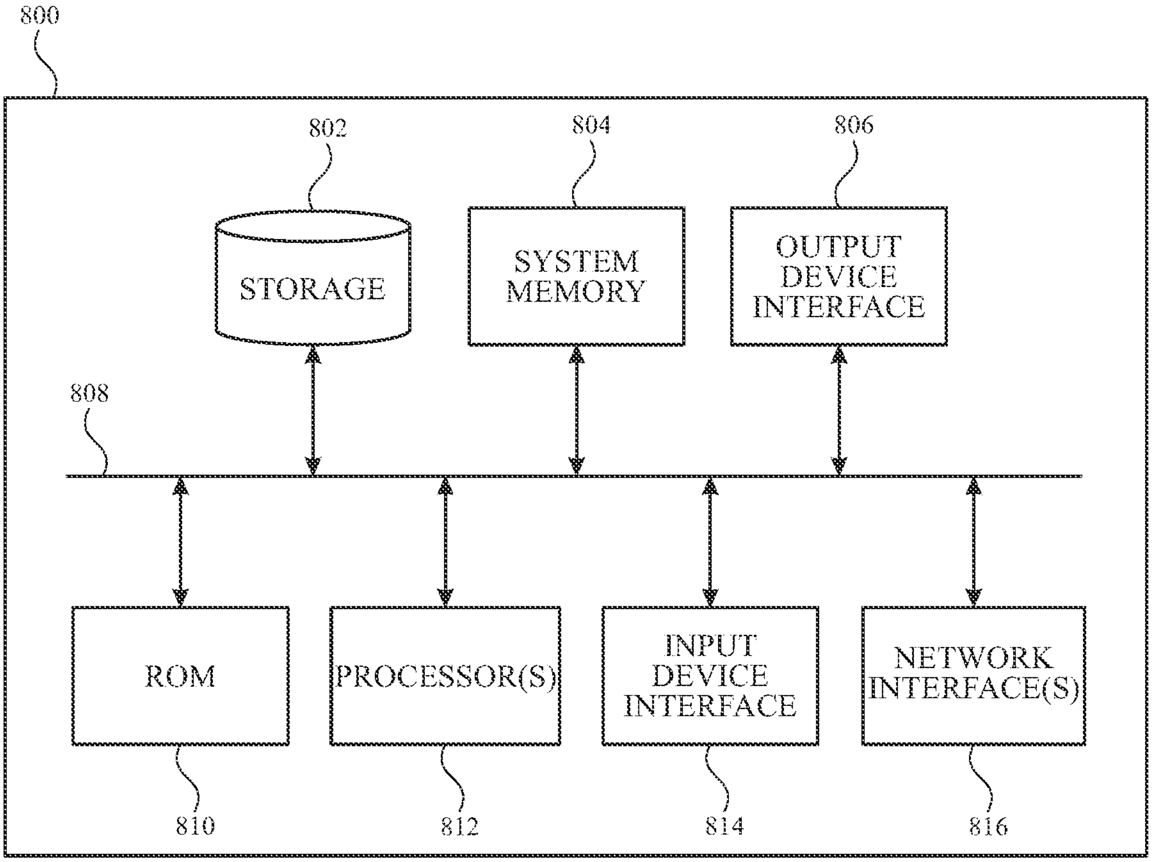
FIG. 8 illustrates an example electronic system with which aspects of the subject technology may be implemented in accordance with one or more implementations.

FIG. 8 illustrates an electronic system 800 with which one or more implementations of the subject technology may be implemented. The electronic system 800 can be, and/or can be a part of, one or more of the electronic device 100 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:

a sound-generating component;

a plurality of speakers; and one or more processors, configured to:

obtain audio content that includes a representation of the sound of the sound-generating component;

obtain a geometric distribution for an output of the audio content, wherein the geometric distribution is configured to mitigate, at the sound-generating component, a sound corresponding to the sound-generating component by including:

a geometric hole, at a location of the sound-generating component, for the output of the representation of the sound of the sound-generating component; and a projection of the representation of the sound of the sound-generating component to one or more other locations different from the location of the sound-generating component; and operate the plurality of speakers to output the audio content in accordance with the obtained geometric distribution.

2. The device of claim 1, wherein the sound-generating component comprises a fan.

3. The device of claim 2, wherein the representation of the sound of the sound-generating component comprises a representation of the sound of the fan.

4. The device of claim 1, wherein the audio content is binaural and non-spatial.

5. The device of claim 1, wherein the audio content comprises at least a first audio layer and a second audio layer, and wherein the one or more processors are configured to operate the plurality of speakers to output the audio content in accordance with the obtained geometric distribution by outputting the first audio layer in a first geometric distribution including the geometric hole and the projection, and outputting the second audio layer in a second geometric distribution different from the first geometric distribution.

6. The device of claim 5, wherein the first audio layer has first frequency characteristics that are different from second frequency characteristics of the second audio layer.

7. The device of claim 1, wherein the one or more processors are configured to obtain additional audio content by recording an environmental sound of a sound-generating entity in a physical environment of the device.

8. The device of claim 7, wherein the one or more processors are configured to output the additional audio content in accordance with an additional geometric distribution by operating the plurality of speakers as a beamforming speaker array to project the recorded environmental sound of the sound-generating entity to a location of the sound-generating entity in the physical environment.

9. The device of claim 1, wherein the one or more processors are configured to obtain the geometric distribution based on a physical characteristic of a user of the device.

10. The device of claim 1, wherein the one or more processors are configured to obtain the geometric distribution based on a three-dimensional map of a physical environment around the device.

11. The device of claim 1, wherein the audio content further comprises media content having one or more frequencies that are the same as or complementary to a frequency of the sound of the sound-generating component.

12. The device of claim 1, wherein the one or more processors are further configured to:

detect a change in an operating state of the device; and cease outputting the audio content.

13. A method, comprising:

operating a sound-generating component of an electronic device;

obtaining audio content including a representation of the sound of the sound-generating component and having a geometric distribution for an output of the audio content, the geometric distribution configured to mitigate, at the sound-generating component, a sound corresponding to the sound-generating component by including:

a geometric hole, at a location of the sound-generating component, for the output of the representation of the sound of the sound-generating component; and a projection of the representation of the sound of the sound-generating component to one or more other locations different from the location of the sound-generating component; and operating a plurality of speakers of the electronic device to output the audio content in accordance with the obtained geometric distribution.

14. The method of claim 13, wherein the sound is generated as a byproduct of a primary function of the component.

15. The method of claim 14, wherein the primary function of the component is a thermal management function for the electronic device.

16. The method of claim 13, wherein the audio content further comprises a sample of an environmental sound generated by a sound-generating entity in a physical environment around the electronic device.

17. A non-transitory, machine-readable medium storing instructions which, when executed by one or more processors, cause the one or more processors to:

operate a sound-generating component of an electronic device;

obtain audio content that includes a representation of the sound of the sound-generating component;

obtain, by the electronic device, a geometric distribution for an output of the audio content, the geometric distribution configured to mitigate, at the sound-generating component, a sound corresponding to the sound-generating component by including:

a geometric hole, at a location of the sound-generating component, in the output of the representation of the sound of the sound-generating component; and a projection of the representation of the sound of the sound-generating component to one or more other locations different from the location of the sound-generating component; and operate a plurality of speakers of the electronic device to output the audio content in accordance with the obtained geometric distribution.

18. The non-transitory, machine-readable medium of claim 17, wherein the sound-generating component comprises a thermal management component.

* * * * *